(12) United States Patent
Wobak et al.

(10) Patent No.: US 9,654,181 B1
(45) Date of Patent: May 16, 2017

(54) DYNAMIC TRANSMITTER SIGNAL ENVELOPE SHAPING CONTROL FOR NFC OR RFID DEVICES

(71) Applicant: NXP B.V., Eindhoven (NL)

(72) Inventors: Markus Wobak, Graz-Puntigam (AT); Leonhard Kormann, Gratkorn (AT); Fred George Nunziata, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/968,788

(22) Filed: Dec. 14, 2015

(51) Int. Cl.
*H04B 5/00* (2006.01)

(52) U.S. Cl.
CPC ......... *H04B 5/0031* (2013.01); *H04B 5/0075* (2013.01)

(58) Field of Classification Search
None
See application file for complete search history.

(56) References Cited

U.S. PATENT DOCUMENTS

| | | | | |
|---|---|---|---|---|
| 6,307,468 | B1 * | 10/2001 | Ward, Jr. | G06K 7/10336 340/10.1 |
| 8,594,605 | B2 * | 11/2013 | Katsube | H03H 11/1252 327/552 |
| 8,692,410 | B2 * | 4/2014 | Schatz | H01Q 1/248 307/104 |
| 8,957,548 | B2 * | 2/2015 | Fuchs | H01Q 1/2216 307/104 |
| 8,977,197 | B2 * | 3/2015 | Krishnan | G06K 7/0008 455/41.1 |
| 9,072,044 | B2 * | 6/2015 | Schelmbauer | H03F 1/308 |
| 9,124,302 | B2 * | 9/2015 | Krishnan | H04B 5/00 |
| 9,360,508 | B2 * | 6/2016 | Bunsen | G01R 27/04 |

(Continued)

FOREIGN PATENT DOCUMENTS

| | | |
|---|---|---|
| EP | 2362375 A1 | 8/2011 |
| EP | 2582063 A2 | 4/2013 |
| WO | WO-2013/006954 A1 | 1/2013 |

OTHER PUBLICATIONS

ISO/IEC 14443-2:2010 "Identification Cards—Contactless Integrated Circuit Cards—Proximity cards—Part 2: Radio Frequency Power and Signal Interface", ISO/IEC, 32 pgs (Sep. 1, 2010).

(Continued)

*Primary Examiner* — Tuan A Tran

(57) ABSTRACT

Transmitter (TX) modulation envelope parameters are defined in RF standards (e.g., ISO 14443, NFC Forum, EMVCo). These envelope parameters include rise/fall times, modulation index, etc. For standards compliancy, these envelope parameters must be within the respective limits. For example, shaping parameters are influenced by detuning the antenna with a counterpart device like a card or mobile phone, or by thermal influences on the matching network. This disclosure describes an NFC or RFID device that is able to detect and measure the detuning on the antenna and/or the matching network change. With this information, the NFC or RFID device can dynamically control the shaping parameters of the envelope, instead of relying on one single static configuration setting for the transmitter. In particular, changes in the Q (quality) factor are used for dynamically controlling the transmitter signal envelope shape for compensating the effect of antenna detuning and/or matching network variation.

20 Claims, 10 Drawing Sheets

(56) References Cited

U.S. PATENT DOCUMENTS

| | | | |
|---|---|---|---|
| 2006/0238301 A1 | 10/2006 | Wu et al. | |
| 2007/0070665 A1* | 3/2007 | Lee | H03B 5/1228 |
| | | | 363/101 |
| 2012/0194265 A1* | 8/2012 | Katsube | H03H 11/1252 |
| | | | 327/554 |
| 2013/0002033 A1* | 1/2013 | Fuchs | H01Q 1/2216 |
| | | | 307/104 |
| 2014/0004794 A1 | 1/2014 | Contaldo et al. | |
| 2014/0323043 A1 | 10/2014 | Shana'a et al. | |
| 2015/0214748 A1* | 7/2015 | Lin | H02J 5/005 |
| | | | 307/104 |

OTHER PUBLICATIONS

Extended European Search Report for Patent Application No. 16202364.2 (Mar. 29, 2017).

* cited by examiner

DYNAMIC TRANSMITTER SIGNAL ENVELOPE SHAPING CONTROL FOR NFC OR RFID DEVICES

FIELD

The described embodiments relate generally to devices and methods for NFC (near field communication) or RFID (Radio-frequency identification), and more particularly to devices and methods that provide for dynamic transmitter signal envelope shaping control for NFC or RFID devices.

BACKGROUND

Wireless communication technologies, such as those used for NFC or ISO 14443 devices, communicate with each other via magnetic field induction in close distance. Each device features an antenna. The primary device ("reader" or "initiator") generates the magnetic field which can be used to power secondary devices like passive transponders. Modulation schemes applied to the magnetic fields are used for communication purpose between the devices.

The primary device uses a transmitter to generate the emitted radio frequency (RF) field. A matching circuitry is used to transform and adapt the antenna impedance to the emitting device's transmitter.

Demand for high power emission can limit the NFC or RFID reader in high data rate communication. More specifically, as the coupling between the primary and secondary device increases, the overall Q (quality) factor of the two (or more) coupled circuits changes according to the coupling factor and the degree of detuning of the resonant circuit of the primary device. The resulting envelope of the transmitted signal is related to the resultant Q factor of the coupled systems.

Because the Q factor can vary greatly for such coupled systems, one single static configuration setting for the transmitter may not be sufficient to overcome this wide variation in Q factor and the resulting envelope shape of the transmitted signal. In compliance of the application system for transmitter signal shaping can occur depending on the distance/position of the secondary device with respect to the primary device. In particular, the transmitter envelope shape may be incompliant to standards.

Therefore, it is desirable to have devices and methods that can provide for dynamic transmitter signal envelope shaping control for NFC or RFID devices.

SUMMARY

Transmitter (TX) modulation envelope parameters are defined in RF standards (e.g., ISO 14443, NFC Forum, EMVCo). These envelope parameters include rise/fall times, rising/falling edge, overshoot, undershoot, modulation index, modulation width, etc. For standards compliancy, these envelope parameters must be within the respective limits over the whole operating volume and measured on the contactless interface. For example, shaping parameters are influenced by detuning the antenna with a counterpart device like a card or mobile phone, or by thermal influences on the matching network. This disclosure describes an NFC or RFID device that is able to detect and measure the detuning on the antenna and/or the matching network change. With this information, the NFC or RFID device can dynamically control the shaping parameters of the envelope, instead of relying on one single static configuration setting for the transmitter. In particular, changes in the Q (quality) factor are used for dynamically controlling the transmitter signal envelope shape for compensating the effect of antenna detuning and/or matching network variation.

Q factor estimation can be achieved using various method embodiments. In a first method embodiment, Q factor estimation can be achieved by sensing the current and/or voltage of an antenna and matching network, and then comparing that result to a reference current and/or voltage level to determine a Q factor. In one embodiment, the reference current and/or voltage level can be the current and/or voltage level for a condition (or state) where the antenna and matching network is not coupled to any counterpart device (i.e., a reader in unload condition). In a second method embodiment, Q factor estimation can be achieved by sensing the current and/or voltage of an antenna and matching network, and then also sensing a TX current and/or voltage of a transmitter to determine a Q factor.

In one embodiment, a method for dynamically controlling transmitter (TX) signal envelope shape is disclosed. The method includes: (1) sensing a TX current and/or voltage of a transmitter, (2) sensing a matching current and/or voltage of an antenna and matching network, (3) determining a Q (quality) factor based on the TX current and/or voltage and the matching current and/or voltage, and (4) dynamically controlling the transmitter (TX) signal envelope shape based on the Q factor. In one embodiment, dynamically controlling the transmitter (TX) signal envelope shape includes: (1) performing digital predistortion of the TX signal envelope, and (2) performing analog signal shaping of the TX signal envelope. In one embodiment, the analog signal shaping of the TX signal envelope is controlled by a pre-driver and is actually achieved by changing an output resistance in an output driver. In one embodiment, the transmitter (TX) signal envelope shape is defined by a plurality of clock pulses with varying amplitudes. In one embodiment, the transmitter (TX) signal envelope shape is controlled based on one or more of the following envelope shaping parameters: fall time, rise time, falling edge, rising edge, overshoot, undershoot, modulation index, modulation width. In one embodiment, the envelope shaping parameters are defined in a RF (radio frequency) standard. In one embodiment, the RF (radio frequency) standard is one of the following standards: ISO 14443, NFC Forum, EMVCo. In one embodiment, the transmitter (TX) signal envelope shape is controlled by using a plurality of preset signal shape configurations. In one embodiment, the plurality of preset signal shape configurations is stored in a memory. In one embodiment, sensing a matching current and/or voltage of an antenna and matching network includes sensing the matching current and/or voltage at one or more nodes of the antenna and matching network. In one embodiment, the Q factor is determined based on a ratio of the TX current divided by the matching current or on a ratio of the TX voltage divided by the matching voltage. In one embodiment, the transmitter is a Near Field Communication (NFC) transmitter or a Radio Frequency Identification (RFID) transmitter.

In one embodiment, a device for dynamically controlling transmitter (TX) signal envelope shape is disclosed. The device includes an antenna and matching circuit configured to be driven by a TX current corresponding to a TX voltage, a first sensor configured to sense the TX current and/or voltage, a second sensor configured to sense a matching current and/or voltage of the antenna and matching network, and a control unit. In one embodiment, the control unit is configured to determining a Q (quality) factor based on the TX current and/or voltage and the matching current and/or voltage, and dynamically controlling the transmitter (TX) signal envelope shape based on the Q factor. The device further includes a digital driver configured to performing digital predistortion of the TX signal envelope, a pre-driver, and an output driver. In one embodiment, the pre-driver and the output driver are configured to perform together analog signal shaping of the TX signal envelope. In one embodiment, the analog signal shaping of the TX signal envelope is achieved by changing an output resistance in the output driver. In one embodiment, the transmitter (TX) signal envelope shape is controlled by using a plurality of preset signal shape configurations. In one embodiment, the device is a Near Field Communication (NFC) device or a Radio Frequency Identification (RFID) device.

In one embodiment, a method for dynamically controlling transmitter (TX) signal envelope shape is disclosed. The method includes sensing a matching current and/or voltage of an antenna and matching network. The method also includes determining a Q (quality) factor based on the matching current and/or voltage as compared to a reference current and/or voltage level. The method further includes dynamically controlling the transmitter (TX) signal envelope shape based on the Q factor. In one embodiment, the reference current and/or voltage level is associated with a condition where the antenna and matching network is not coupled to any counterpart device. In one embodiment, the antenna and matching network is associated with a Near Field Communication (NFC) device or a Radio Frequency Identification (RFID) device.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
FIG. 1 shows a concept for dynamically controlling transmitter (TX) signal envelope shape for NFC or RFID devices, in accordance with some example embodiments.

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As the coupling between a primary (e.g., reader) and secondary (e.g., counterpart) device increases, the overall Q (quality) factor of the two (or more) coupled circuits changes according to the coupling factor and the degree of detuning of the resonant circuit of the primary device. The resulting envelope of the transmitted signal is related to the resultant Q factor of the coupled systems. Because the Q factor can vary greatly for such coupled systems, one single static configuration setting for the transmitter (i.e., reader) may not be sufficient to overcome this wide variation in Q factor and the resulting envelope shape of the transmitted signal.

In particular, the transmitter (TX) modulation envelope parameters are defined in RF (radio frequency) standards (e.g., ISO 14443, NFC Forum, EMVCo). These envelope parameters include rise/fall times, over and undershoots, and modulation index. For standards compliancy, these envelope parameters must be within the respective limits over the whole operating volume and measured on the contactless interface. For example, the shaping parameters are influenced by detuning the antenna with a counterpart device like a card or mobile phone, or by thermal influences on the matching network.

This disclosure describes an NFC or RFID device that is able to detect and measure the detuning on the antenna and/or the matching network change. With this information, the NFC or RFID device can dynamically adapt the shaping parameters of the envelope. In other words, the NFC or RFID device can detect antenna detuning and/or matching network variation. Based on this information, the transmitter signal envelope shape is dynamically controlled to compensate the effect of antenna detuning and/or matching network variation. In particular, changes in the Q (quality) factor can be used to detect antenna detuning and/or matching network variation. Therefore, the Q factor estimation can be used for dynamically controlling the transmitter signal envelope shape for compensating the effect of antenna detuning and/or matching network variation. This, in turn, would allow for the NFC or RFID device to be compliant to the RF standards for the transmitter (TX) modulation envelope parameters under all conditions.

As such, FIG. 1 shows a key concept for dynamically controlling transmitter (TX) signal envelope shape for NFC or RFID devices, in accordance with some example embodiments. In particular, FIG. 1 shows that Q factor estimation can be used for signal shaping regulation. Or, in other words, Q factor estimation can be used for dynamically controlling transmitter (TX) signal envelope shape.

Q factor estimation can be achieved using various method embodiments. In a first method embodiment, Q factor estimation can be achieved by sensing the current and/or voltage of an antenna and matching network, and then comparing that result to a reference current and/or voltage level to determine a Q factor. In one embodiment, the reference current and/or voltage level can be a defined reference state, such as a reader in unload condition. In one embodiment, the reference current and/or voltage level can be the current and/or voltage level for a condition (or state) where the antenna and matching network is not coupled to any counterpart device. In one embodiment, sensing the matching current and/or voltage of an antenna and matching network can be achieved by sensing the matching current and/or voltage at one or more nodes of the antenna and matching network.

In a second method embodiment, Q factor estimation can be achieved by sensing the current and/or voltage of an antenna and matching network, and then also sensing a TX current and/or voltage of a transmitter to determine a Q factor.

For signal shaping regulation (which includes dynamically controlling transmitter (TX) signal envelope shape), the shaping regulation includes digital and analog predistortion of the transmitted signal. It also includes analog regulation of an output driver (e.g., changing a supply voltage and/or an output resistance of the output driver).

Figure 2:
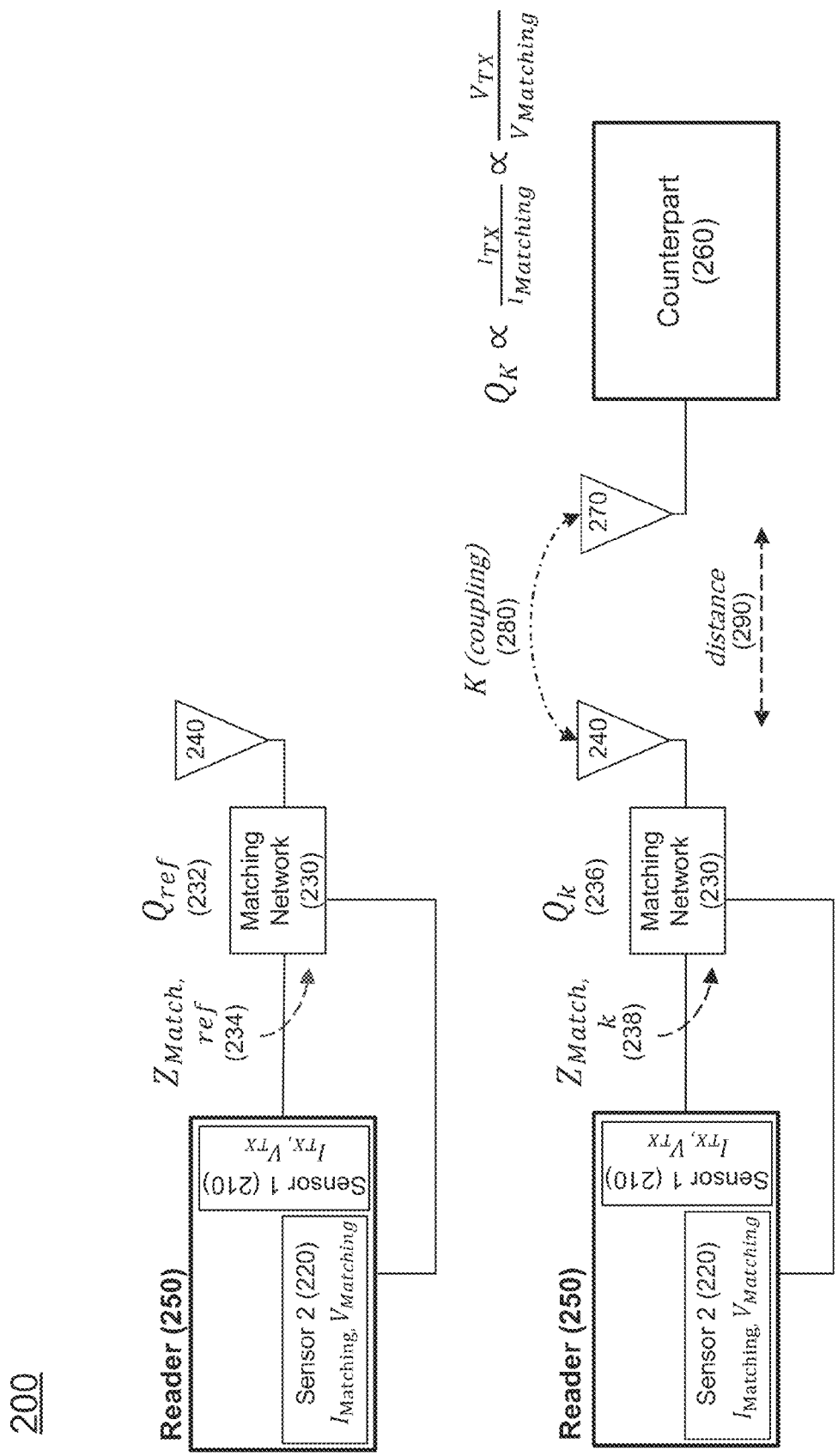
FIG. 2 shows a method for Q (quality) factor estimation for 2 different conditions (1. a reader not coupled to a counterpart device and 2. a reader coupled to a counterpart device), in accordance with some example embodiments.

FIG. 2 shows a method for Q (quality) factor estimation for 2 different conditions (1. a reader not coupled a counterpart device and 2. a reader coupled to a counterpart device), in accordance with some example embodiments. In particular, FIG. 2 shows a system 200 that includes a reader 250, a matching network 230, an antenna 240, a counterpart device 260, and a counterpart antenna 270. In FIG. 2, reader 250 is the primary device that generates the magnetic field which can be used to power a secondary device, such as counterpart device 260 (which, for example, can be a passive transponder). Modulation schemes applied to the magnetic fields are used for communication purpose between reader 250 and counterpart 260. In FIG. 2, each device features an antenna. Accordingly, antenna 240 is associated with reader 250, while antenna 270 is associated with counterpart 260. The primary device, reader 250, uses a transmitter to generate the emitted radio frequency (RF) field. A matching circuitry, shown as matching network 230, is used to transform and adapt the antenna impedance to the emitting device's transmitter. Reader 250 includes sensor 1 (210) and sensor 2 (220). Sensor 1 (210) is used for sensing a TX current and/or voltage of a transmitter belonging to reader 250. The transmitter is not explicitly shown in FIG. 2, but the TX current and voltage of the transmitter are denoted as $I_{TX}$ and $V_{TX}$, respectively. Sensor 2 (220) is used for sensing a matching current and/or voltage of an antenna and matching network. The matching current and voltage are denoted as $I_{MATCHING}$ and $V_{MATCHING}$, respectively. There is also corresponding a Q (quality) factor and a matching network impedance ($Z_{MATCH}$) for each condition (or state) of the system.

FIG. 2 shows two different conditions (or states). In condition one (or state one), reader 250 is not coupled to counterpart 260. In one embodiment, condition one (or state one) can be referred to as a reference state. In particular, condition one (or state one) can be a defined reference state for use in determining the Q factor. Accordingly, for condition one (or state one), the corresponding Q factor and matching network impedance are denoted as $Q_{REF}$ and $Z_{MATCH, REF}$.

In condition two (or state two), reader 250 is coupled to counterpart 260. Here, there is a coupling K (280) between reader 250 and counterpart 260. Accordingly, for this state, the corresponding Q factor and matching network impedance are denoted as $Q_K$ and $Z_{MATCH, K}$. The quality factor $Q_K$ also depends on the distance/position (i.e., distance 290) of the secondary device antenna (i.e., counterpart antenna 270) with respect to the primary device antenna (i.e., reader antenna 240). From a detection point of view, it can be shown that $Q_K$ is proportional to $I_{TX}/I_{MATCHING}$ or $V_{TX}/V_{MATCHING}$. In other words:

$$Q_K \propto I_{TX}/I_{MATCHING} \propto V_{TX}/V_{MATCHING}$$

FIG. 2 shows that the Q (quality) factor estimation can be accomplished by sensing TX current and/or voltage. In one embodiment, only the TX current is monitored, so that Q factor change is detected by a change in the TX current. In one embodiment, only the TX voltage is monitored, so that Q factor change is detected by a change in the TX voltage. This is because Q factor change can lead to both a change in the TX current and voltage. In one embodiment, both the TX current and voltage are monitored, so that Q factor change is detected by a change in both the TX current and voltage. This is because Q factor change can be better detected by monitoring both the change in the TX current and voltage. In one embodiment, the Q factor change can be detected by monitoring: (1) only the TX current, (2) only the TX voltage, or (3) both the TX current and voltage. The detection method selected can depend on the precision and speed of detection, as well as the ease and cost of detection and implementation.

FIG. 2 also shows that the Q (quality) factor estimation can be accomplished by sensing a matching current and/or voltage of the antenna and matching network 230. In one embodiment, only a current of the antenna and matching network is sensed, so that Q factor change is detected by a change in the current of the antenna and matching network. In one embodiment, only a voltage of the antenna and matching network is sensed, so that Q factor change is detected by a change in the voltage of the antenna and matching network. In one embodiment, both the current and voltage of the antenna and matching network are sensed, so that Q factor change is detected by a change in both the current and voltage of the antenna and matching network. This is because Q factor change can be better detected by monitoring both the change in the current and voltage of the antenna and matching network. In one embodiment, the Q factor change can be detected by monitoring: (1) only the current, (2) only the voltage, or (3) both the current and voltage of the antenna and matching network. The detection method selected can depend on the precision and speed of detection, as well as the ease and cost of detection and implementation.

In one embodiment, sensor 2 (labelled 220) senses the current and voltage of the matching network at one node of the antenna and matching network. In one embodiment, sensor 2 (labelled 220) senses the current and voltage of the matching network at one or more nodes of the antenna and matching network.

Figure 3:
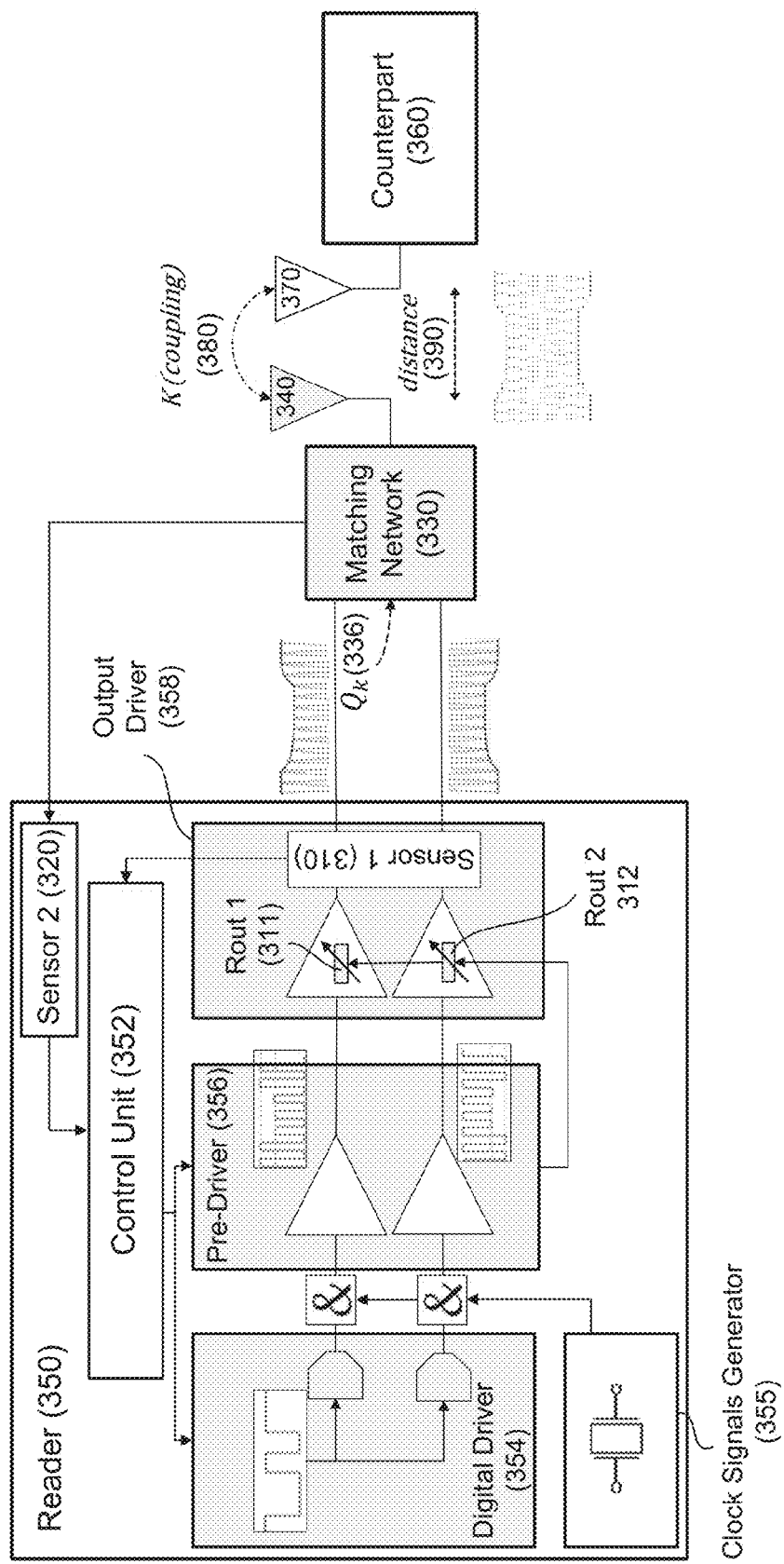
FIG. 3 shows a reader device configured for dynamically controlling transmitter (TX) signal envelope shape for NFC or RFID devices, in accordance with some example embodiments.

FIG. 3 shows a reader device 350 configured for dynamically controlling transmitter (TX) signal envelope shape for NFC or RFID devices, in accordance with some example embodiments. In FIG. 3, reader 350 is the primary device that generates the magnetic field which can be used to power a secondary device like counterpart device 360 (which, for example, can be a passive transponder). Modulation schemes applied to the magnetic fields are used for communication purpose between reader 350 and counterpart 360. In FIG. 3, each device features an antenna. Accordingly, antenna 340 is associated with reader 350, while antenna 370 is associated with counterpart 360. The primary device, reader 350, uses a transmitter to generate the emitted radio frequency (RF) field. A matching circuitry, shown as matching network 330, is used to transform and adapt the antenna impedance to the emitting device's transmitter. Reader device 350 includes sensor 1 (310), sensor 2 (320), controller 352, digital driver 354, pre-driver 356, output driver 358, and clock signals generator 355.

FIG. 3 shows that, in one embodiment, sensor 1 (311) can be included in the output driver 358. Sensor 1 (311) is used for sensing a TX current and/or voltage of a transmitter belonging to reader 350. The TX current and voltage of the transmitter can be denoted as $I_{TX}$ and $V_{TX}$, respectively, but are not shown in FIG. 3. Sensor 2 (320) is used for sensing a matching current and/or voltage of matching network 330 associated with reader 350. The matching current and voltage can be denoted as $I_{MATCHING}$ and $V_{MATCHING}$, respectively, but are not shown in FIG. 3. There is also a corresponding quality factor $Q_K$ (labelled 336) and a matching network impedance ($Z_{MATCH}$) that is not shown in FIG. 3.

Reader 350 is coupled to counterpart 360, so there is a coupling K (380) between reader 350 and counterpart 360. Accordingly, the corresponding Q (quality) factor is denoted as $Q_K$. This quality factor $Q_K$ also depends on the distance/position (i.e., distance 390) of the secondary device antenna (i.e., counterpart antenna 370) with respect to the primary device antenna (i.e., reader antenna 340). There is also a corresponding matching network impedance that can be denoted as $Z_{MATCH, K}$, but $Z_{MATCH, K}$ is not shown in FIG. 3.

As previously described in FIG. 2, sensor 1 (310) can sense $I_{TX}$ and $V_{TX}$, while sensor 2 (320) can sense $I_{MATCHING}$ and $V_{MATCHING}$. $I_{TX}/V_{TX}$ and $I_{MATCHING}/V_{MATCHING}$ are then inputted into the control unit 352. Control unit 352 can then use $I_{TX}/V_{TX}$ and $I_{MATCHING}/V_{MATCHING}$ to determine the Q factor ($Q_K$). In one embodiment, the equation below can be used:

$$Q_K \propto I_{TX}/I_{MATCHING} \propto V_{TX}/V_{MATCHING}$$

Therefore, in one embodiment, the Q factor is determined based on a ratio of the TX current divided by the matching current or on a ratio of the TX voltage divided by the matching voltage.

Control unit 352 can further set up the configuration settings for dynamically controlling transmitter (TX) signal envelope shape. In one embodiment, this is achieved through the inputs to digital driver 354 and pre-driver 356. Digital driver 354 can provide for digital predistortion and base-band digital signal. An example of the signal in the digital driver 354 is shown in FIG. 3. Pre-driver 356 can provided for analog signal shaping control. An example of the signal in the pre-driver 356 is shown in FIG. 3. Additionally, a clock signal can be provided by the clock signals generator 355.

In reader device 350 of FIG. 3, the output driver 358 includes sensor 1 (310) and internal resistances (i.e., $R_{OUT}$ 1, $R_{OUT}$ 2). In FIG. 3, internal resistances are shown as $R_{OUT}$ 1 (311), $R_{OUT}$ 2 (312). Output driver 358 can regulate the TX signal envelope by changing a power supply voltage or internal resistances (i.e., $R_{OUT}$ 1, $R_{OUT}$ 2). This change in the power supply voltage or internal resistances (i.e., $R_{OUT}$ 1, $R_{OUT}$ 2) will in turn cause the output voltages (i.e., $V_{TX}$) to be changed. In one embodiment, the internal resistances can be any transmitter internal resistance, which can be used to regulate the TX signal envelope. In one embodiment, the power supply voltage can be any transmitter supply voltage, which can be used to regulate the TX signal envelope.

In one embodiment, the pre-driver 356 provides for amplification, while the output driver 358 provides for attenuation. In one embodiment, output driver 358 is an active attenuator that is providing active attenuation. The output driver 358 is not an amplifier. The output driver 358 actively attenuates the input signal from the pre-driver 356, while the input signal is amplified (boosted) in the pre-driver 356. In particular, the maximum output voltage level of the output driver 358 is regulated by changing the supply voltage or the output resistance. In one embodiment, attenuation is obtained by reducing the power supply voltage or by changing the number of NMOS (Rout), where NMOS is an n-channel MOSFET (metal-oxide-semiconductor field-effect transistor). In one embodiment, NMOS or PMOS transistors can provide the internal resistances (i.e., $R_{OUT}$ 1, $R_{OUT}$ 2) needed for regulating the TX current. In this regard, in one embodiment, $R_{OUT}$ 1, $R_{OUT}$ 2 can be an array of transistors that can be turned on or off to produce the required resistance.

Therefore, in one embodiment, the analog signal shaping of the TX signal envelope is controlled by a pre-driver and is actually achieved by changing an output resistance in an output driver.

Furthermore, an example of the signal transmitted by the output driver 358 is shown in FIG. 3. An example of the signal transmitted between antenna 340 and antenna 370 is shown in FIG. 3.

Figure 4:
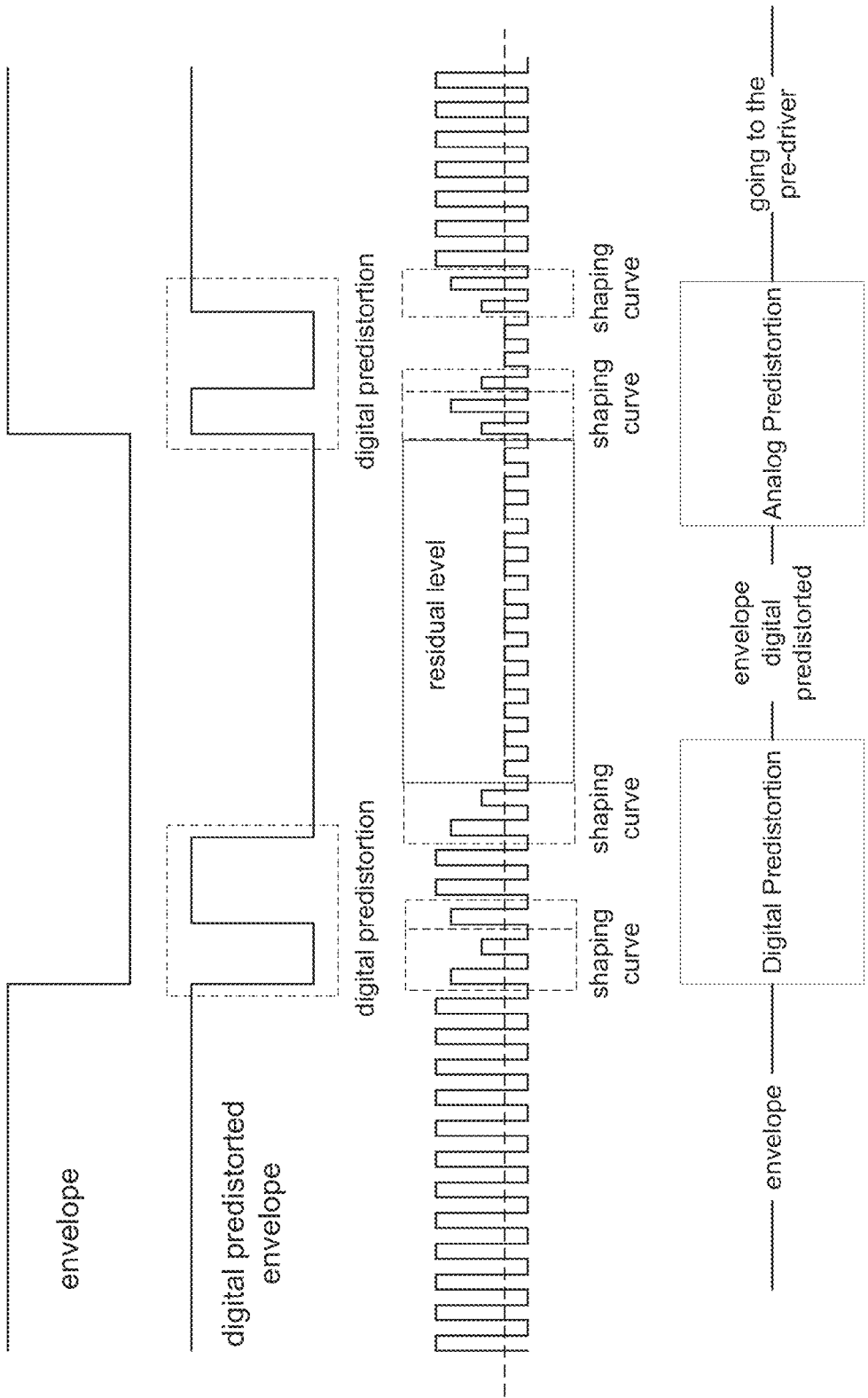
FIG. 4 shows how a reader device (such as one shown in FIG. 3) can dynamically control transmitter (TX) signal envelope shape, in accordance with some example embodiments.

FIG. 4 shows how a reader device (such as one shown in FIG. 3) can dynamically control transmitter (TX) signal envelope shape, in accordance with some example embodiments. In one embodiment, the digital driver 354 can provided for digital predistortion to the envelope to generate the digital predistorted envelope. Then a clock signal is provided by the clock signals generator 355, while the pre-driver 356 can provided for analog signal shaping control. Note that a residual level can be maintained after the analog signal shaping.

Figure 5A:
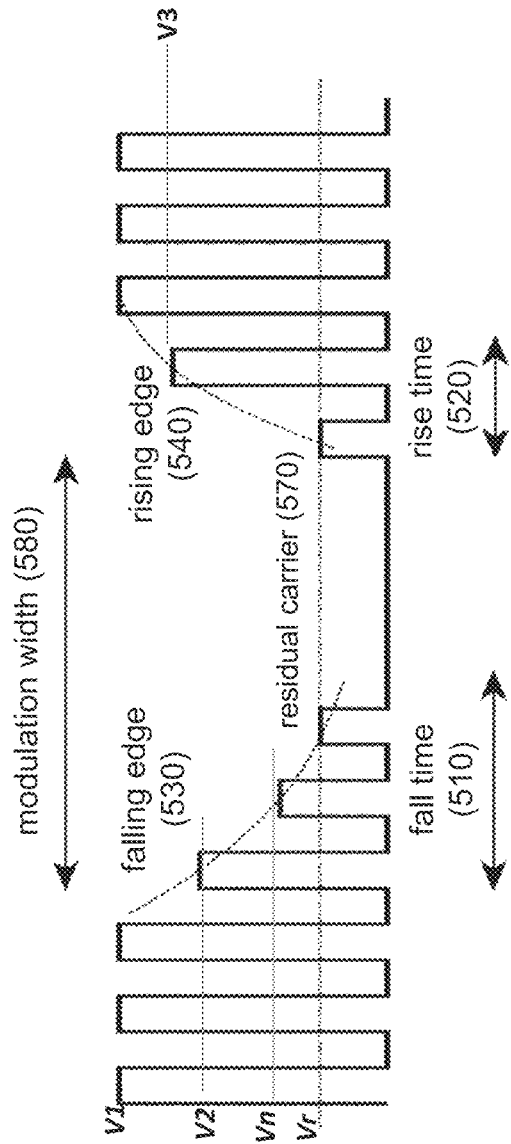
FIG. 5A shows an example of the transmitter (TX) signal output from a reader device (such as one shown in FIG. 3), in accordance with some example embodiments.
Figure 5B:
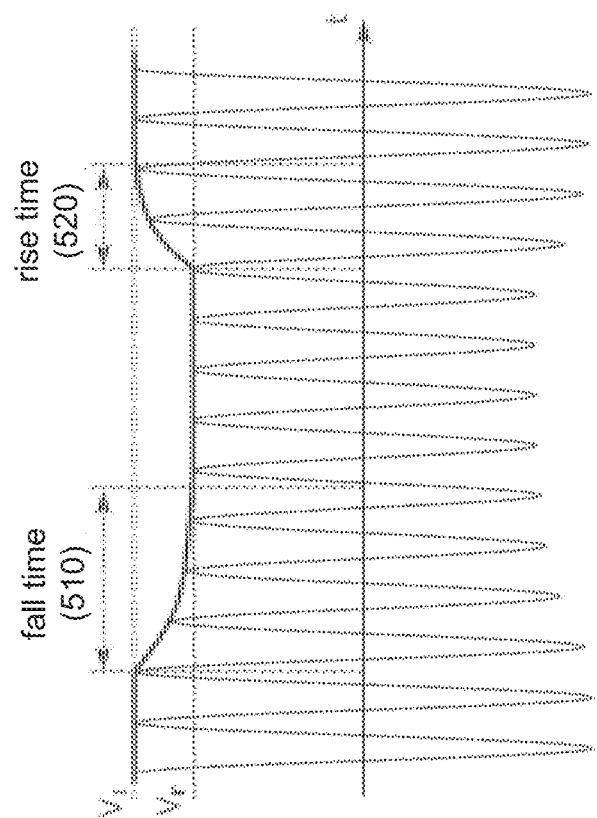
FIG. 5B shows the corresponding signal at the matching network and antenna, in accordance with some example embodiments.

FIG. 5A shows an example of the transmitter (TX) signal output from a reader device (such as one shown in FIG. 3), in accordance with some example embodiments. FIG. 5B shows the corresponding signal at the matching network and antenna, in accordance with some example embodiments. One of the goals for dynamically controlling transmitter (TX) signal envelope shape is so that the NFC or RFID device can be compliant to the RF standards for the transmitter (TX) modulation envelope parameters under all conditions. In one embodiment, these RF standards include one or more of the following: ISO 14443, NFC Forum, and EMVCo. In one embodiment, envelope shaping parameters can include one or more of the following: fall time, rise time, falling edge, rising edge, overshoot, undershoot, modulation index, and modulation width, residual level, and residual carrier. In one embodiment, the transmitter (TX) signal envelope shape is controlled based on one or more of the following envelope shaping parameters: fall time, rise time, falling edge, rising edge, overshoot, undershoot, modulation index, modulation width, residual level, and residual carrier. Accordingly, an example of the signal output from the pre-driver and output driver is shown in FIG. 5A. In FIG. 5A, these envelope shaping parameters are labelled: fall time 510, rise time 520, falling edge 530, rising edge 540, modulation width 580, and residual carrier 570. Other envelope shaping parameters may also be shown, but are not labelled.

Different signal shape settings (for the digital and analog TX signal predistortion) can be defined to adapt for varying load conditions. Each of these signal shape settings can be mapped to a specific Q factor estimation. In one embodiment, if AQC (Adaptive Q factor Controller) is implemented, several damping resistors can be set to adapt for varying load/detuning conditions.

For a specific Q factor, different Vn levels are set in order to build the envelope of the TX signal. For instance, setting different Vn levels (1, 2, 3, . . . n) within the "fall time" allows a user to define the falling edge of the final TX signal envelope. Setting different Vn levels (1, 2, 3, . . . n) within the "rise time" allows a user to define the rising edge of the final TX signal envelope. In FIG. 5A, Vr defines the residual carrier. Therefore, in one embodiment, the transmitter (TX) signal envelope shape is defined by a plurality of clock pulses with varying amplitudes.

FIG. 5B shows the corresponding signal at the matching network and antenna for the signal shown in FIG. 5A, in accordance with some example embodiments. In FIG. 5B, these envelope shaping parameters are labelled: fall time 510, rise time 520, and residual carrier Vr. Falling edge, rising edge, and modulation width, as well as other envelope shaping parameters, may also be shown, but are not labelled.

Figure 6:
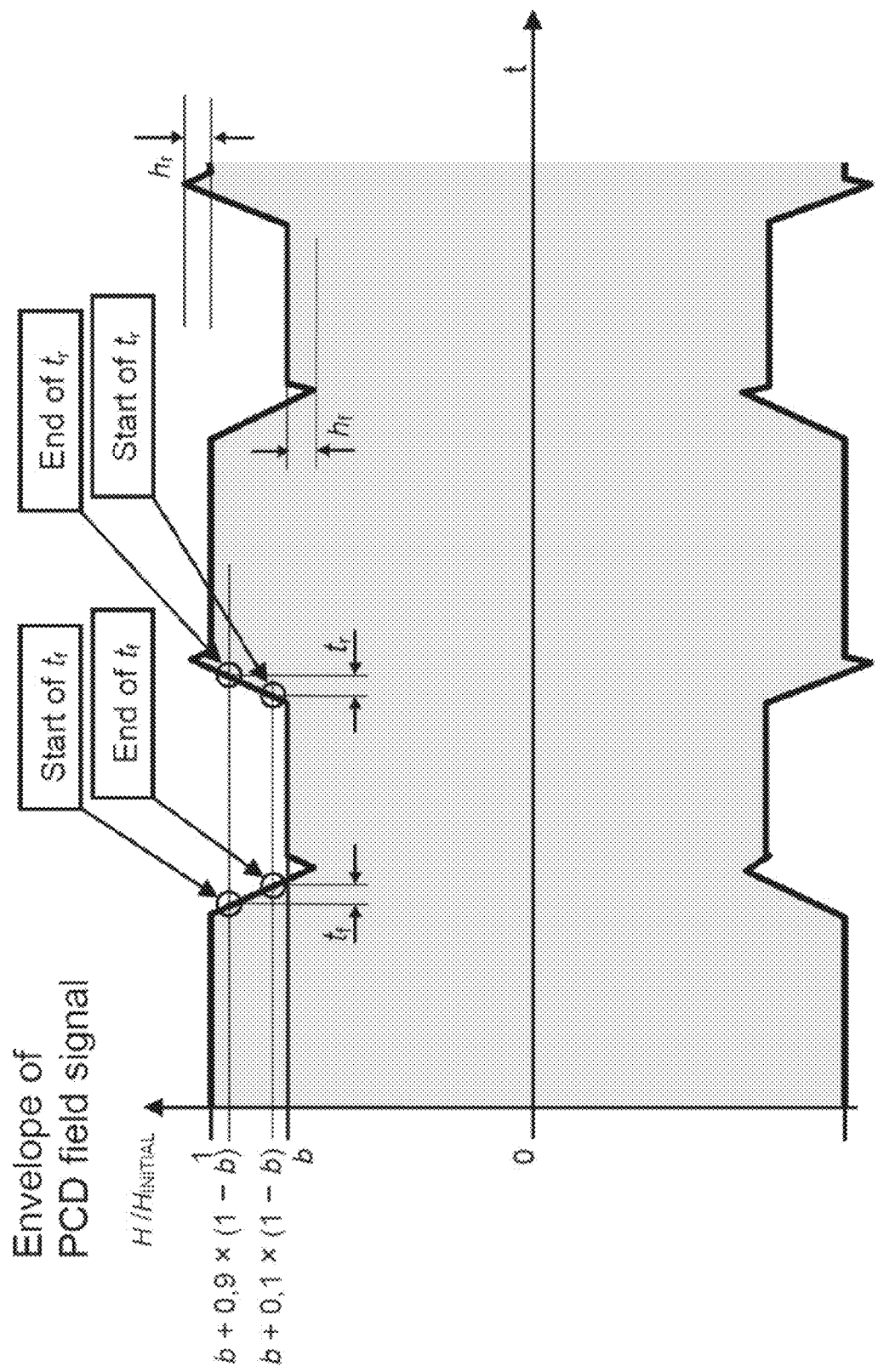
FIG. 6 shows some of the transmitter (TX) signal envelope shaping parameters, in accordance with some example embodiments.

FIG. 6 shows some of the transmitter (TX) signal envelope shaping parameters, in accordance with some example embodiments. As described earlier, in one embodiment, envelope shaping parameters can include fall time, rise time, falling edge, rising edge, overshoot, undershoot, modulation index, and modulation width, residual level, and residual carrier. In FIG. 6, these envelope shaping parameters are labelled: fall time tf, rise time tr, falling edge (between Start of tf and End of tf), rising edge (between Start of tr and End of tr), overshoot hr, and undershoot hf. Other envelope shaping parameters may also be shown, but are not labelled. In FIG. 6, PCD stands for proximity coupling device. The parameter H represents the equivalent homogenous magnetic field strength. The parameter $H_{INITIAL}$ represents the field strength of the unmodulated RF field. The parameter b represents the ratio between the modulated and initial signal amplitude, Type B. The parameter t represents time.

Figure 7:
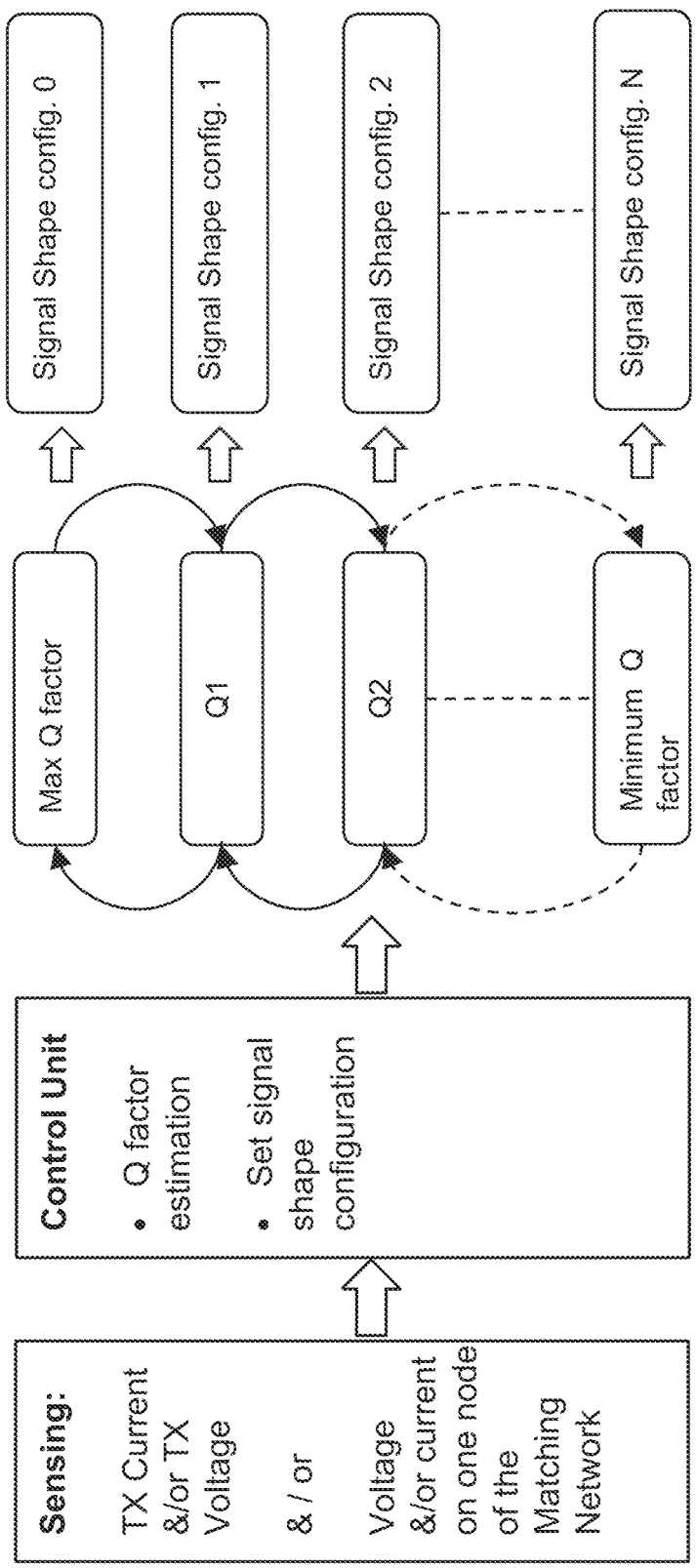
FIG. 7 shows a method for Q (quality) factor estimation and a method for dynamically controlling the transmitter (TX) signal envelope shape by using a plurality of preset signal shape configurations, in accordance with some example embodiments.

FIG. 7 shows a method for Q (quality) factor estimation and a method for dynamically controlling the transmitter (TX) signal envelope shape by using a plurality of preset signal shape configurations, in accordance with some example embodiments.

FIG. 7 shows that, in one embodiment, a method for sensing is to sense a TX current and/or voltage, and to sense a current and/or voltage on one node of the matching network. In one embodiment, a method for sensing is to sense a TX current and/or voltage only. In one embodiment, a method for sensing is to sense a current and/or voltage on one node of the matching network.

FIG. 7 shows that a control unit can: (a) use the sensing result to perform Q factor estimation, and (b) set signal shape configuration based on the Q factor estimation.

FIG. 7 shows one embodiment for setting signal shape configuration based on the Q factor estimation. In this embodiment, several signal shape configuration settings (for the digital and analog TX signal predistortion) are defined to adapt for varying load conditions. Each of these signal shape configuration settings can be mapped onto a specific range of Q factor estimations. In this embodiment, there exists a finite set of "discrete" signal shape configuration settings, so that a range of Q factor estimations is mapped onto each "discrete" signal shape configuration setting. Therefore, in one embodiment, the transmitter (TX) signal envelope shape is controlled by using a plurality of preset signal shape configurations. Furthermore, in one embodiment, the plurality of preset signal shape configurations is stored in a memory. In another embodiment, the plurality of preset signal shape configurations is stored in a non-volatile memory.

In another embodiment (not shown in FIG. 7), there can be a continuous set of signal shape configuration settings, so each Q factor estimation is mapped onto its own individual signal shape configuration setting. Therefore, in theory, there can exist an infinite set of "continuous" signal shape configuration settings.

Figure 8:
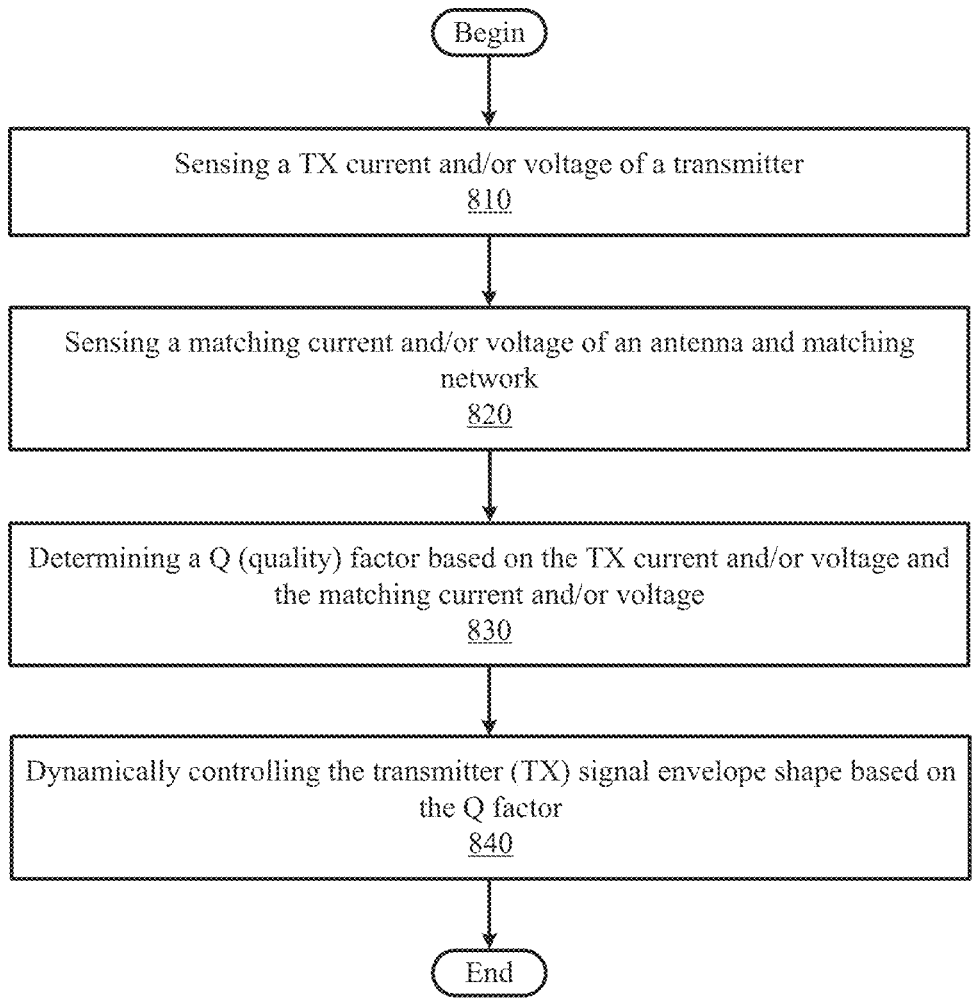
FIG. 8 shows a flow chart of method steps for dynamically controlling transmitter (TX) signal envelope shape (by sensing both: (1) a TX current and/or voltage of a transmitter and (2) a matching current and/or voltage of an antenna and matching network, for a change in the Q factor), in accordance with some example embodiments.

FIG. 8 shows a flow chart of method steps for dynamically controlling transmitter (TX) signal envelope shape (by sensing both: (1) a TX current and/or voltage of a transmitter and (2) a matching current and/or voltage of an antenna and matching network, for a change in the Q factor), in accordance with some example embodiments. As shown in FIG. 8, the method 800 begins at step 810, where the method senses a TX current and/or voltage of a transmitter. Then, the method proceeds to step 820. In step 820, the method senses a matching current and/or voltage of an antenna and matching network. Next, at step 830, the method determines a Q (quality) factor based on the TX current and/or voltage and the matching current and/or voltage. Finally, at step 840, the method dynamically controls the transmitter (TX) signal envelope shape based on the Q factor.

Figure 9:
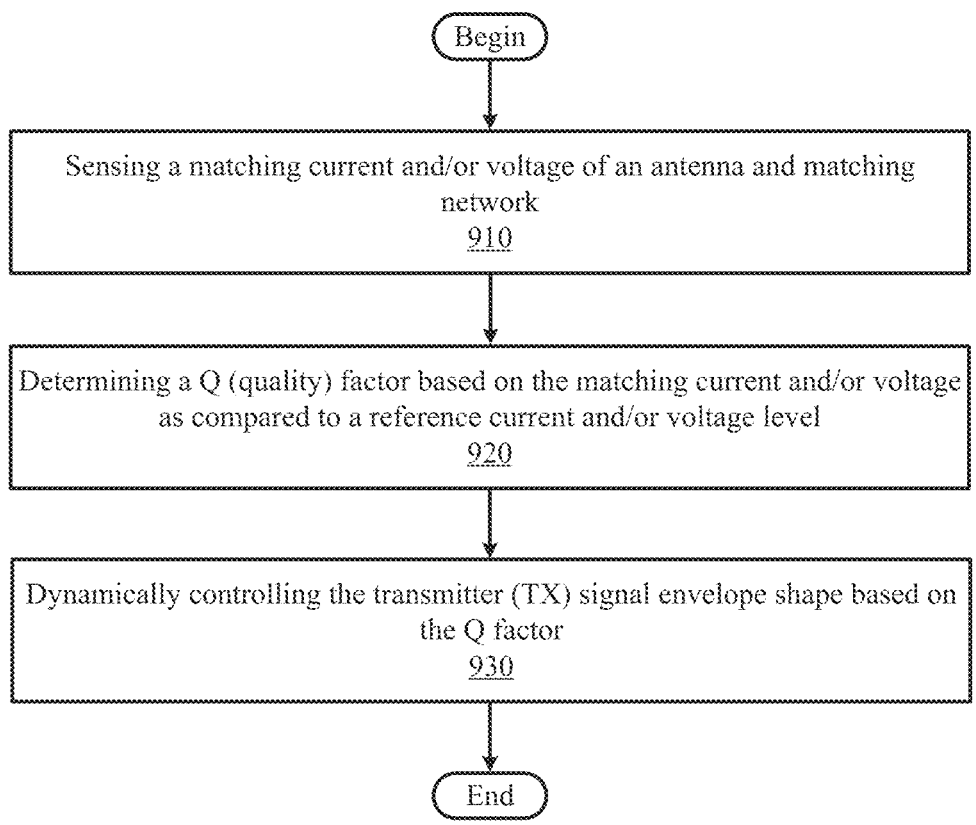
FIG. 9 shows a flow chart of method steps for dynamically controlling transmitter (TX) signal envelope shape (by (1) sensing a matching current and/or voltage of an antenna and matching network and (2) comparing it to a reference current and/or voltage level, for a change in the Q factor), in accordance with some example embodiments.

FIG. 9 shows a flow chart of method steps for dynamically controlling transmitter (TX) signal envelope shape (by (1) sensing a matching current and/or voltage of an antenna and matching network and (2) comparing it to a reference current and/or voltage level, for a change in the Q factor), in accordance with some example embodiments. As shown in FIG. 9, the method 900 begins at step 910, where the method senses a matching current and/or voltage of an antenna and matching network. Then, the method proceeds to step 920. In step 920, the method determines a Q (quality) factor based on the matching current and/or voltage as compared to a reference current and/or voltage level. Finally, at step 930, the method dynamically controls the transmitter (TX) signal envelope shape based on the Q factor.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically controlling transmitter (TX) signal envelope shape, the method comprising:
   sensing a TX current and/or voltage of a transmitter;
   sensing a matching current and/or voltage of an antenna and matching network;
   determining a Q (quality) factor based on the TX current and/or voltage and the matching current and/or voltage;
   dynamically controlling the transmitter (TX) signal envelope shape based on the Q factor.

2. The method of claim 1, wherein dynamically controlling the transmitter (TX) signal envelope shape comprises:
   performing digital predistortion of the TX signal envelope;
   performing analog signal shaping of the TX signal envelope.

3. The method of claim 2, wherein the analog signal shaping of the TX signal envelope is controlled by a pre-driver and is actually achieved by changing an output resistance in an output driver.

4. The method of claim 1, wherein the transmitter (TX) signal envelope shape is defined by a plurality of clock pulses with varying amplitudes.

5. The method of claim 1, wherein the transmitter (TX) signal envelope shape is controlled based on one or more of the following envelope shaping parameters: fall time, rise time, falling edge, rising edge, overshoot, undershoot, modulation index, modulation width.

6. The method of claim 5, wherein the envelope shaping parameters are defined in a RF (radio frequency) standard.

7. The method of claim 6, wherein the RF (radio frequency) standard is one of the following standards: ISO 14443, NFC Forum, EMVCo.

8. The method of claim 1, wherein the transmitter (TX) signal envelope shape is controlled by using a plurality of preset signal shape configurations.

9. The method of claim 8, wherein the plurality of preset signal shape configurations is stored in a memory.

10. The method of claim 1, wherein sensing a matching current and/or voltage of an antenna and matching network comprises:
    sensing the matching current and/or voltage at one or more nodes of the antenna and matching network.

11. The method of claim 1, wherein the Q factor is determined based on a ratio of the TX current divided by the matching current or on a ratio of the TX voltage divided by the matching voltage.

12. The method of claim 1, wherein the transmitter is a Near Field Communication (NFC) transmitter or a Radio Frequency Identification (RFID) transmitter.

13. A device for dynamically controlling transmitter (TX) signal envelope shape, the device comprising:
    an antenna and matching circuit configured to be driven by a TX current corresponding to a TX voltage;
    a first sensor configured to sense the TX current and/or voltage;
    a second sensor configured to sense a matching current and/or voltage of the antenna and matching network;
    a control unit configured to:
        determining a Q (quality) factor based on the TX current and/or voltage and the matching current and/or voltage,
        dynamically controlling the transmitter (TX) signal envelope shape based on the Q factor.

14. The device of claim 13 further comprising:
    a digital driver configured to performing digital predistortion of the TX signal envelope;
    a pre-driver;
    an output driver,
    wherein the pre-driver and the output driver are configured to perform together analog signal shaping of the TX signal envelope.

15. The device of claim 14, wherein the analog signal shaping of the TX signal envelope is achieved by changing an output resistance in the output driver.

16. The device of claim 13, wherein the transmitter (TX) signal envelope shape is controlled by using a plurality of preset signal shape configurations.

17. The device of claim 13, wherein the device is a Near Field Communication (NFC) device or a Radio Frequency Identification (RFID) device.

18. A method for dynamically controlling transmitter (TX) signal envelope shape, the method comprising:
    sensing a matching current and/or voltage of an antenna and matching network;
    determining a Q (quality) factor based on the matching current and/or voltage as compared to a reference current and/or voltage level;
    dynamically controlling the transmitter (TX) signal envelope shape based on the Q factor, wherein dynamically controlling the transmitter (TX) signal envelope shape comprises:
        performing digital predistortion of the TX signal envelope,
        performing analog signal shaping of the TX signal envelope.

19. The method of claim 18, wherein the reference current and/or voltage level is associated with a condition where the antenna and matching network is not coupled to any counterpart device.

20. The method of claim 18, wherein the antenna and matching network is associated with a Near Field Communication (NFC) device or a Radio Frequency Identification (RFID) device.

* * * * *